March 29, 1932.   S. B. HASELTINE   1,851,577
FRICTION SHOCK ABSORBING MECHANISM
Filed May 16, 1929
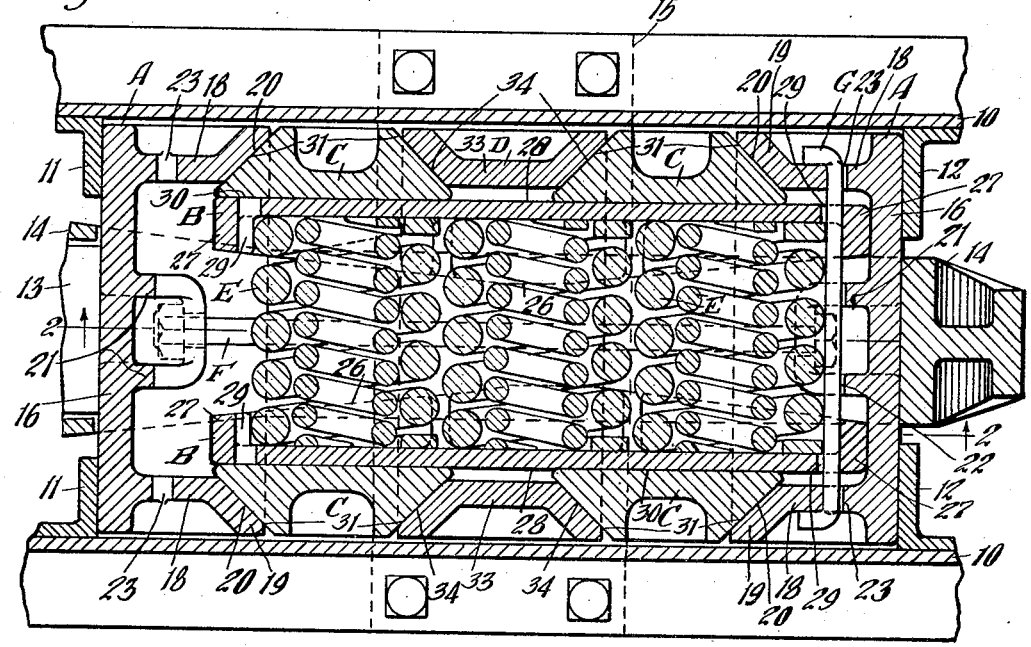
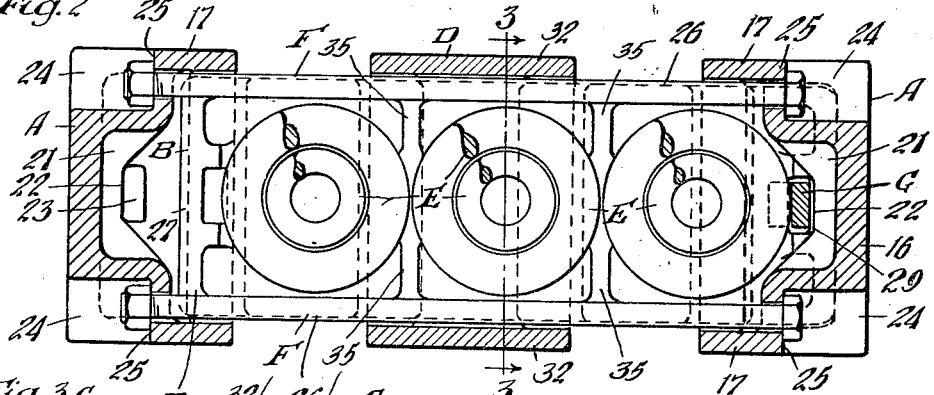
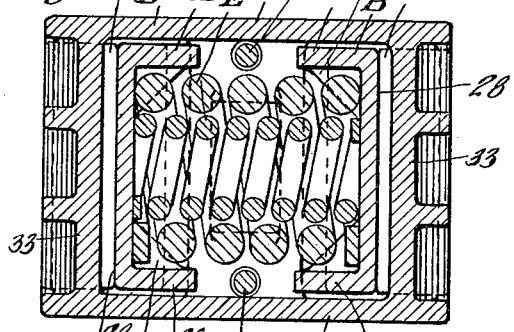
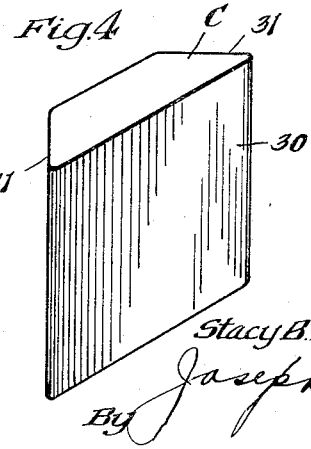
Inventor
Stacy B. Haseltine
By Joseph Harris
His Atty.
Witness
Wm. Geiger Patented Mar. 29, 1932

1,851,577

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 16, 1929. Serial No. 363,583.

This invention relates to improvements in friction shock absorbing mechanisms.

One object of the invention is to provide a high capacity friction shock absorbing mechanism specially adapted for railway draft riggings, including a pair of longitudinally disposed friction members, means for yieldingly opposing lateral approach of the friction members, friction wedge means cooperating with the friction surfaces of the friction members and means for wedging the friction wedge means laterally, inwardly against and also longitudinally of the friction members, thereby providing high capacity frictional resistance on the various cooperating wedge faces and friction surfaces of the mechanism.

A more specific object of the invention is to provide a friction shock absorbing mechanism including relatively movable followers, a pair of longitudinally disposed friction members laterally movable with respect to each other; spring resistance means opposing lateral approach of the friction members; friction wedge blocks movable longitudinally of the mechanism along the friction members; and wedge means actuated by relative approach of the followers for forcing the friction wedge blocks laterally inwardly against the friction members, thereby compressing the spring resistance and also forcing the wedge blocks to slide lengthwise of the friction surfaces of the friction members to produce frictional resistance.

Other objects of the invention will more clearly appear from the description and claims hereinafter following.

In the drawings, forming a part of this specification, Figure 1 is a horizontal, longitudinal sectional view through the underframe structure of a railway car, at one end of the same, illustrating my improvements in connection therewith. Figure 2 is a horizontal, longitudinal, sectional view corresponding substantially to the line 2—2 of Figure 1. Figure 3 is a transverse, vertical, sectional view corresponding substantially to the line 3—3 of Figure 2. And Figure 4 is a detailed perspective view of a friction wedge block employed in connection with my improved shock absorbing mechanism.

In said drawings, 10—10 indicate channel-shaped center or draft sills of a railway car underframe to the inner sides of which are secured front stop lugs 11—11 and rear stop lugs 12—12. The inner end portion of the usual coupler shank is indicated by 13, to which is operatively connected a hooded yoke 14 of well known form. My improved friction shock absorbing mechanism is disposed within the yoke and the yoke in turn is supported by a detachable saddle plate 15 secured to the bottom flanges of the draft sills 10. My improved friction shock absorbing mechanism comprises broadly front and rear follower casings A—A; a pair of longitudinally disposed friction members B—B; two pairs of friction wedge blocks C—C and C—C; a central wedge casing D; a main spring resistance E; a pair of retainer bolts F—F; and an anchoring element G.

The front and rear follower casing A are of similar design, each cooperating with one pair of stop lugs of the draft sills. Each casing A comprises a relatively heavy transverse outer end wall 16, spaced top and bottom walls 17—17 and spaced side walls 18—18. The side walls 18 have outwardly diverging end sections 19—19 at the inner end of the casing A, the inner faces of the sections 19 presenting opposed wedge faces 20—20. The main portions of the side walls 18 are inwardly offset with respect to the outer edges of the end wall 16 and are reinforced by horizontally extending webs. The end wall of each casing is provided with a pair of vertically disposed interior ribs 21—21, the ribs 21 being notched on their inner sides as indicated at 22—22 to accommodate the anchoring element G of the casing. The side walls 18 of the casing are provided with perforations 23—23 in transverse alinement with the notches 22—22. As most clearly shown in Figure 2, the casings are recessed centrally at the upper and lower sides as indicated at 24—24, thereby providing transverse vertical abutment shoulders 25—25, which cooperate with the retaining bolts F—F as hereinafter pointed out.

The friction members B—B are of similar design and are arranged on opposite sides of the mechanism. Each member B is provided with top and bottom inwardly projecting horizontal flanges 26—26 and vertical end flanges 27—27. On the outer side each member B presents a longitudinally disposed flat friction surface 28. The friction members B are of such a length that the opposite ends thereof extend into the front and rear follower casings A in the normal, full release position of the parts. It is further pointed out that these members are of such a length that the opposite ends will be engaged by the end walls of the casings A when the mechanism is fully compressed, thereby limiting relative approach of the follower casings. Each of the friction members B is provided with openings 29—29 at opposite ends thereof adapted to receive the anchoring element G. The members B are anchored to the rear follower casing A as shown in the present instance, the same being connected to the casing by the anchoring element G, which is in the form of a bar of substantially rectangular cross section. As shown, the member G extends through the openings 23 of the side walls of the rear follower casing A, the openings 29 of the members B, and has the intermediate portion thereof seated in the notches 22 of the casing. As will be evident, the members B may be secured to the front follower casing instead of to the rear follower casing by making use of the openings 29 at the forward ends of the members B and the openings 23 of the casing A.

The friction wedge blocks C—C are of similar design and are arranged in pairs at the front and rear ends of the mechanism. The members of each pair of friction wedge blocks C are disposed on opposite sides of the pair of longitudinally disposed friction members B—B. Each block C has a longitudinally extending flat surface 30 which cooperates with the friction surface 28 of the friction member B at the same side of the mechanism. On the outer side each block C is provided with front and rear wedge faces 31—31.

The wedge face 31 at the outer end of each block engages the wedge face 20 at the corresponding side of the follower casing A at the same end of the mechanism. The other wedge face 31 of each block C cooperates with the central wedge casing D.

The central wedge casing D is in the form of a rectangular sleeve having spaced top and bottom walls 32—32 and vertical side walls 33—33. As shown the sleeve D is open at the front and rear ends and has the friction members B extending therethrough. Each of the side walls 33 of the casing D is provided with interior wedge faces 34—34 at opposite ends thereof. The wedge faces 34 at each end of the casing D are opposed and diverge outwardly of the mechanism. The wedge faces 34 at the front and rear ends of the casing engage the wedge faces 31—31 of the front and rear wedge blocks C at the same side of the mechanism. As shown, the wedge blocks C are of such a length that the opposite ends thereof extend into the casing D and the front and rear follower casing C so that the wedge blocks are supported by the casing and the front and rear followers in all operative positions of the parts.

The main spring resistance E, which is interposed between the two friction members B—B, preferably comprises three spring members extending transversely of the mechanism and having their opposite ends bearing on the inner sides of the vertical walls of the members B. Each spring member preferably comprises a relatively light inner coil and a heavier outer coil. As most clearly shown in Figure 3, the top and bottom flanges 26 of the members B overhang the ends of the springs, thereby holding the same in proper position and maintaining them assembled with the mechanism. The inner sides of the vertical walls of the members B are preferably reinforced by webs 35—35 which also serve as spacing means for the spring members as clearly shown in Figure 2.

The retainer bolts F—F are preferably two in number and are arranged at the top and bottom of the mechanism above and below the spring resistance E. The bolts F extend through the central casing D and alined openings in the front and rear follower casings A, each bolt having the head thereof abutting the wall 25 of the rear follower casing and the nut at the opposite end thereof abutting the wall 25 of the front follower casing. As shown, the head and the nut of each bolt is accommodated within the corresponding cut away portion 24 of the follower A, thereby allowing for the necessary relative movement of the follower casings A and the bolts during the compression of the mechanism.

In addition to holding the mechanism assembled, the retaining bolts F also maintain the mechanism of uniform overall length. The bolts are preferably so adjusted when the mechanism is assembled that the main spring resistance E is under initial compression, thereby compensating for wear of the various wedge faces and friction surfaces of the mechanism.

In the operation of my improved shock absorbing mechanism when either a buffing or draft force is applied, the follower casings A will be moved relatively inwardly toward each other. During relative approach of the follower casings A, a wedging action will be set up between the same and the friction wedge blocks C. At the same time due to the inward movement of the blocks C, a wedging action will be set up between the latter and the wedge casing D. The blocks C at opposite sides of the mechanism will thus be forced laterally inwardly toward each other, thereby forcing the longitudinally disposed friction members B—B laterally inwardly toward each other also and compressing the main spring resistance E. During the movement of the casings A toward each other while effecting lateral inward wedging action on the wedge blocks C, the blocks C will be forced to slide lengthwise on the friction surfaces of the members B, thereby greatly augmenting the resistance of the mechanism, due to the friction thus produced. The compression of the mechanism will continue until the front ends of the friction members B are engaged by the end wall 16 of the front follower casing A, whereupon the members B will limit the relative approach of the follower casings and prevent excessive compression of the main spring resistance E. As will be evident, the two members B together form a solid colum load transmitting member, when the mechanism is fully compressed, transmitting the actuating force from one follower directly to the other and to the stop lugs of the draft sills.

During release of the mechanism, the expansive action of the main spring resistance E will force the friction members B—B laterally apart, carrying the wedge blocks C—C therewith. Due to the lateral separation of the wedge blocks C—C at opposite sides of the mechanism, the front and rear follower casings A will be wedged apart and restored to the normal full release position, outward movement of the casings being limited by the retainer bolts F. As will be evident, during the releasing action of the mechanism, the friction members B will be held against longitudinal movement with respect to the rear follower casing A by the anchoring element G. While the anchoring element G prevents relative lengthwise movement of the friction members B and the rear follower casing A, the same permits the free, lateral approach and separation of these members.

I have herein shown and described what I now consider the preferred manner of carrying out my invention, but the same is merely ilustrative and I contemplate all changes and modifications that come within the scope of the claims appended hereto.

I claim:

1. In a friction shock absorbing mechanism, the combination with front and rear follower acting means; of a pair of longitudinally disposed friction members; means interposed between said members opposing lateral approach thereof; wedge means at opposite sides of said members, including a plurality of members, certain of which have frictional engagement with said side members and wedging engagement with the front and rear followers, whereby the last named wedge members are forced laterally inwardly upon relative approach of said followers and moved lengthwise of the mechanism.

2. In a friction shock absorbing mechanism, the combination with front and rear followers relatively movable toward and away from each other; of longitudinally disposed friction members interposed between said followers; wedge means at opposite sides of said friction members, said wedge means being movable lengthwise with respect to the friction members; said followers having wedging engagement with the wedge means; and spring resistance means interposed between said friction members opposing lateral approach of the same.

3. In a friction shock absorbing mechanism, the combination with lateral inwardly acting wedge members, including front and rear follower elements and a central casing element; of a pair of longitudinally disposed friction members anchored to one of said elements against relative longitudinal movement but having lateral movement with respect thereto; spring resistance means yieldingly opposing relative approach of said members; and friction wedge blocks at opposite sides of said members cooperating with said elements and wedged laterally, inwardly thereby upon relative approach of said followers, said blocks having a sliding engagement with the friction members.

4. In a friction shock absorbing mechanism, the combination with front and rear followers, of a pair of longitudinally disposed friction members laterally movable toward and away from each other, spring resistance means opposing lateral approach of said members; means for holding said members against movement lengthwise of one of said followers; friction wedge means at opposite sides of said members, including a plurality of elements, certain of which have frictional engagement with said members and are forced laterally inwardly upon relative approach of said followers.

5. In a friction shock absorbing mechanism, the combination with front and rear follower casings, each having opposed interior wedge faces; of a floating casing interposed between said followers, said casing having sets of opposed interior wedge faces at opposite ends thereof; a pair of longitudinally disposed friction members interposed between said followers and extending through the casing; spring resistance means interposed between the friction members opposing relative approach of the same; and front and rear pairs of friction wedge blocks at opposite sides of said members and having frictional engagement therewith, each pair of wedge blocks having wedging engagement with the wedge faces at one end of the casing and with the wedge faces of one of said follower casings.

6. In a friction shock absorbing mechanism, the combination with front and rear followers relatively movable toward and away from each other; of a pair of longitudinally disposed friction members interposed between said followers; means yieldingly opposing lateral approach of said friction members; wedge friction blocks at opposite sides of said members having frictional engagement therewith and wedging engagement with one of said followers; and means opposing lateral outward movement of said blocks.

7. In a friction shock absorbing mechanism, the combination with front and rear followers; of a pair of longitudinally disposed friction members interposed between said followers; a plurality of transversely disposed springs interposed between said friction members opposing relative lateral approach of the same; a floating central member embracing said pair of friction members; and front and rear pairs of friction wedge blocks at opposite sides of said pair of friction members, said blocks being slidable on the friction members, each pair of wedge blocks having wedging engagement with one of said followers and with the floating central member.

8. In a friction shock absorbing mechanism, the combination with front and rear follower casings, having laterally inwardly acting wedge means thereon; of a pair of longitudinally disposed, spaced friction members, said members being laterally movable with respect to each other and connected to one of said follower casings for movement therewith; a central floating casing surrounding said pair of friction members, said casing having inwardly acting wedge means thereon; and front and rear sets of friction blocks disposed at opposite sides of said friction members and having wedging engagement with the inwardly acting wedge means of the floating casing and front and rear follower casings.

9. In a friction shock absorbing mechanism, the combination with front and rear followers; of a pair of longitudinally disposed spaced friction elements laterally movable toward and away from each other, said elements being engaged at opposite ends by the followers upon full compression of the mechanism to limit relative approach of the followers, thereby providing a column member transmitting the actuating force from one follower to the other; means yieldingly opposing lateral approach of said friction members; friction blocks between said followers on opposite sides of said pair of friction members and longitudinally slidable thereon; a central casing; and wedge means on said followers and casing having wedging engagement with said blocks for forcing said friction blocks laterally inwardly against the friction members and effecting relative longitudinal movement of said friction blocks and friction elements upon relative movement of said front and rear followers toward each other.

10. In a friction shock absorbing mechanism, the combination with side members extending lengthwise of the mechanism and having longitudinally disposed outer friction surfaces; of spring resistance means opposing relative lateral approach of said side members; friction elements at opposite sides of said side members slidable lengthwise on the friction surfaces thereof; and means having wedging engagement with opposite ends of said friction elements for wedging the same laterally inwardly against said side members and forcing the side members toward each other to compress said spring resistance.

11. In a friction shock absorbing mechanism, the combination with front and rear followers; of a casing disposed between said followers; friction elements disposed lengthwise of the mechanism at opposite sides thereof and having wedging engagement with said followers and casing whereby said members are forced laterally inwardly upon relative approach of said followers; a pair of side members between said friction elements and having frictional engagement therewith; and means between said side members yieldingly opposing relative approach thereof.

12. In a friction shock absorbing mechanism, the combination with spaced side members extending lengthwise of the mechanism, and movable laterally toward each other; of spring means opposing relative approach of said side members, said side members having exterior friction surfaces and friction elements at opposite sides of the mechanism having frictional engagement with said side members and movable lengthwise thereon; and means for wedging said friction elements laterally inwardly, said means including front and rear follower casings having wedging engagement with said friction elements and a floating casing interposed between said follower casings and also having wedging engagement with said elements.

13. In a friction shock absorbing mechanism, the combination with front and rear follower casings having interior opposed wedge faces; of a floating casing interposed between said follower casings, said casing having front and rear sets of interior opposed wedge faces; front and rear pairs of friction elements at opposite sides of the mechanism, each of said elements having wedge faces at opposite ends thereof cooperating with a wedge face of one of said followers and one of the wedge faces of said floating casing; longitudinally extending spaced side members interposed between said follower casings and extending through said floating casing, said side members and friction elements having cooperating friction surfaces extending lengthwise of the mechanism; and spring resistance means opposing relative lateral approach of said side members.

14. In a friction shock absorbing mechanism, the combination with front and rear follower casings having interior opposed wedge faces; of a floating casing interposed between said follower casings, said casing having front and rear sets of interior opposed wedge faces; front and rear pairs of friction elements at opposite sides of the mechanism, each of said elements having wedge faces at opposite ends thereof cooperating with a wedge face of one of said followers and one of the wedge faces of said floating casing; longitudinally extending spaced side members interposed between said follower casings and extending through said floating casing and telescoped with said front and rear follower casings, said side members and friction elements having cooperating friction surfaces extending lengthwise of the mechanism, said friction elements being supported by said front and rear follower casings and said floating casing; and spring resistance means opposing relative lateral approach of said side members.

In witness that I claim the foregoing I have hereunto subscribed my name this 15th day of May 1929.

STACY B. HASELTINE.